(12) United States Patent
Spuller et al.

(10) Patent No.: US 10,695,964 B2
(45) Date of Patent: *Jun. 30, 2020

(54) HOT RUNNER INJECTION NOZZLE AND DRIVE TRAIN

(71) Applicant: Otto Männer Innovation GmbH, Bahlingen (DE)

(72) Inventors: Swen Spuller, Forchheim (DE); Benedikt Stoll, Bötzingen (DE)

(73) Assignee: OTTO MÄNNER INNOVATION GMBH, Bahlingen (DE)

( * ) Notice: Subject to any disclaimer, the term of this patent is extended or adjusted under 35 U.S.C. 154(b) by 181 days.

This patent is subject to a terminal disclaimer.

(21) Appl. No.: 15/871,592

(22) Filed: Jan. 15, 2018

(65) Prior Publication Data

US 2018/0236531 A1 Aug. 23, 2018

(30) Foreign Application Priority Data

Feb. 17, 2017 (EP) .................................... 17156782
May 19, 2017 (EP) .................................... 17172036

(51) Int. Cl.
*B29C 45/28* (2006.01)
*B29C 45/27* (2006.01)
*B22D 17/20* (2006.01)

(52) U.S. Cl.
CPC ...... *B29C 45/2735* (2013.01); *B22D 17/2023* (2013.01); *B22D 17/2053* (2013.01); *B29C 45/2737* (2013.01); *B29C 45/281* (2013.01); B29C 2045/2759 (2013.01); B29C 2045/2813 (2013.01); B29C 2045/2831 (2013.01); B29C 2045/2841 (2013.01); *B29C 2045/2848* (2013.01); *B29C 2045/2862* (2013.01);
(Continued)

(58) Field of Classification Search
CPC . B29C 45/231; B29C 45/2735; B29C 45/281; B29C 2045/2813; B29C 2045/2831
See application file for complete search history.

(56) References Cited

U.S. PATENT DOCUMENTS

| | | | |
|---|---|---|---|
| 7,470,123 B2* | 12/2008 | Spuller | B29C 45/2735 425/564 |
| 7,658,606 B2* | 2/2010 | Klobucar | B29C 45/2735 264/328.9 |
| 9,452,557 B2* | 9/2016 | Keitel | B29C 45/281 |

(Continued)

FOREIGN PATENT DOCUMENTS

WO  2015150501  10/2015

*Primary Examiner* — James P Mackey
(74) *Attorney, Agent, or Firm* — Pauley Erickson & Kottis

(57) ABSTRACT

The present disclosure is directed to an injection nozzle for an injection molding device comprising a drive train for at least one closure element arranged movable in a nozzle head in a first direction. The drive train comprises a cam mechanism with a cam head comprising a wedge and at least one side plate. The wedge and the side plate are together arranged moveable in a second direction. Per closure element the wedge comprises at least one first drive surface which interacts with a second drive surface arranged at the closure element at least during closing of the closure element. The at least one side plate comprises a third drive surface which interacts with a fourth drive surface arranged at the closure element at least during opening of the closure element.

18 Claims, 5 Drawing Sheets

(52) U.S. Cl.
 CPC ............... *B29C 2045/2872* (2013.01); *B29C 2945/76277* (2013.01)

(56) References Cited

U.S. PATENT DOCUMENTS

2006/0233911 A1 10/2006 Spuller
2008/0152752 A1 6/2008 Klobucar et al.

\* cited by examiner

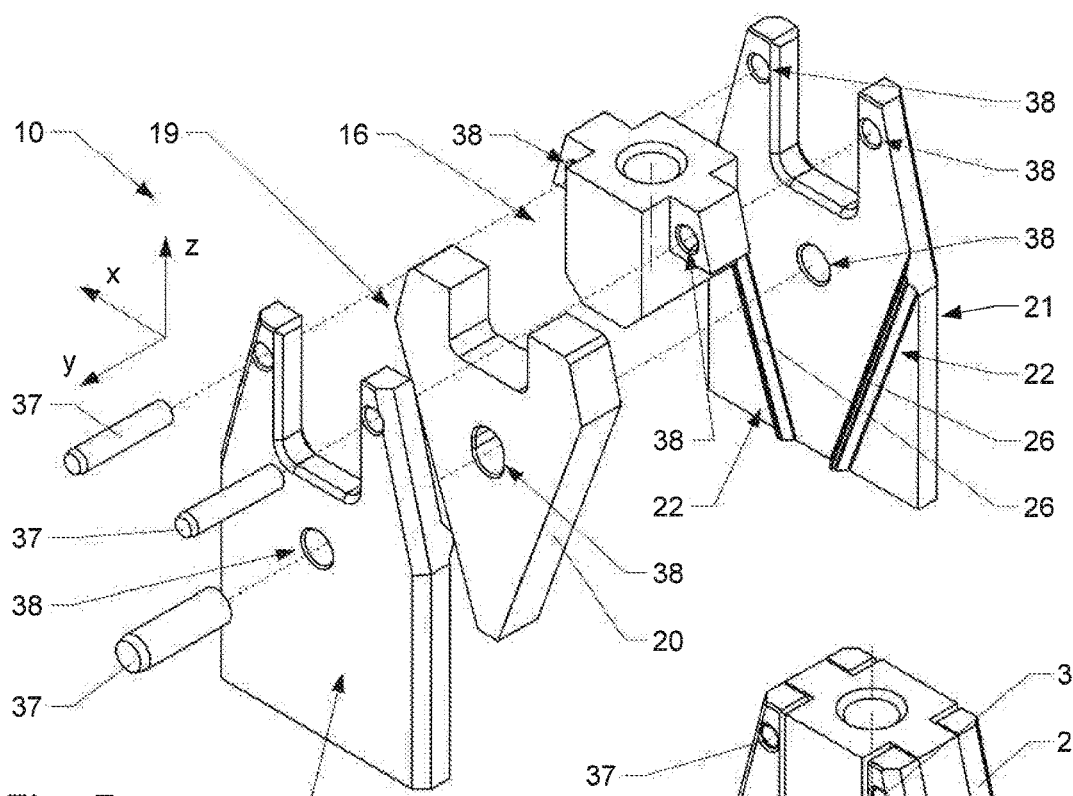
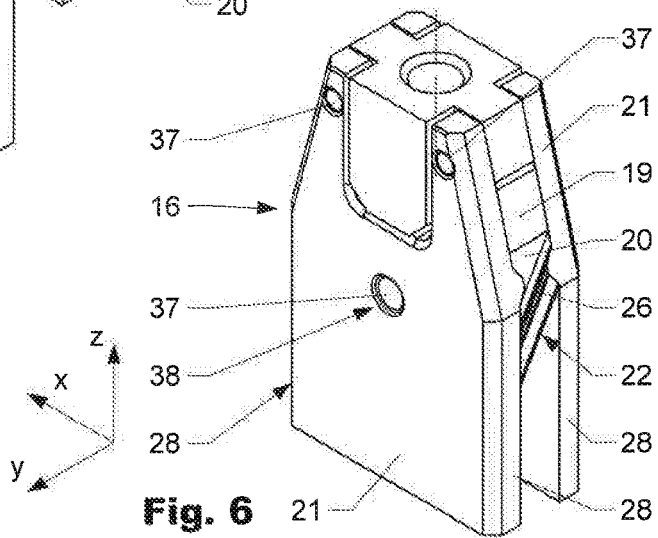
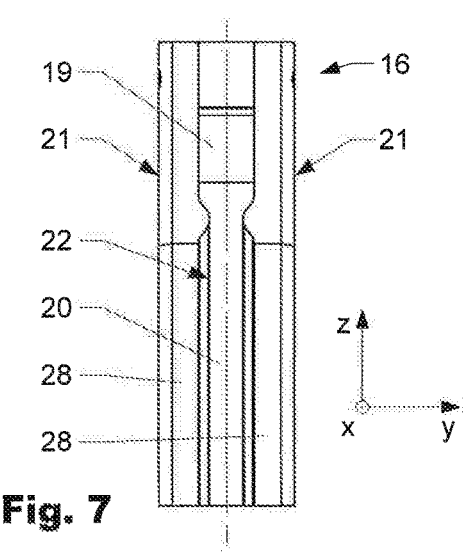
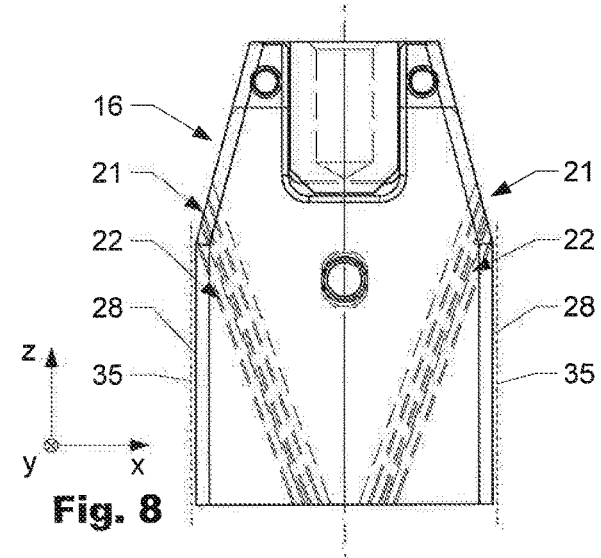

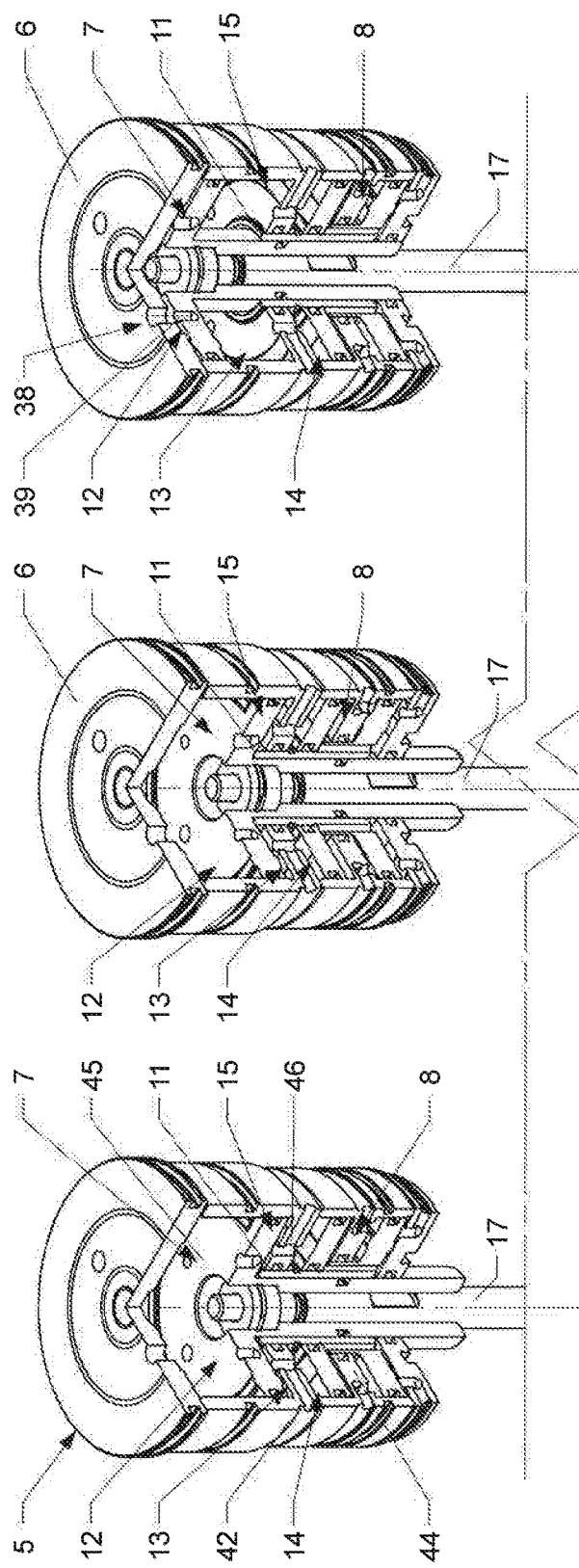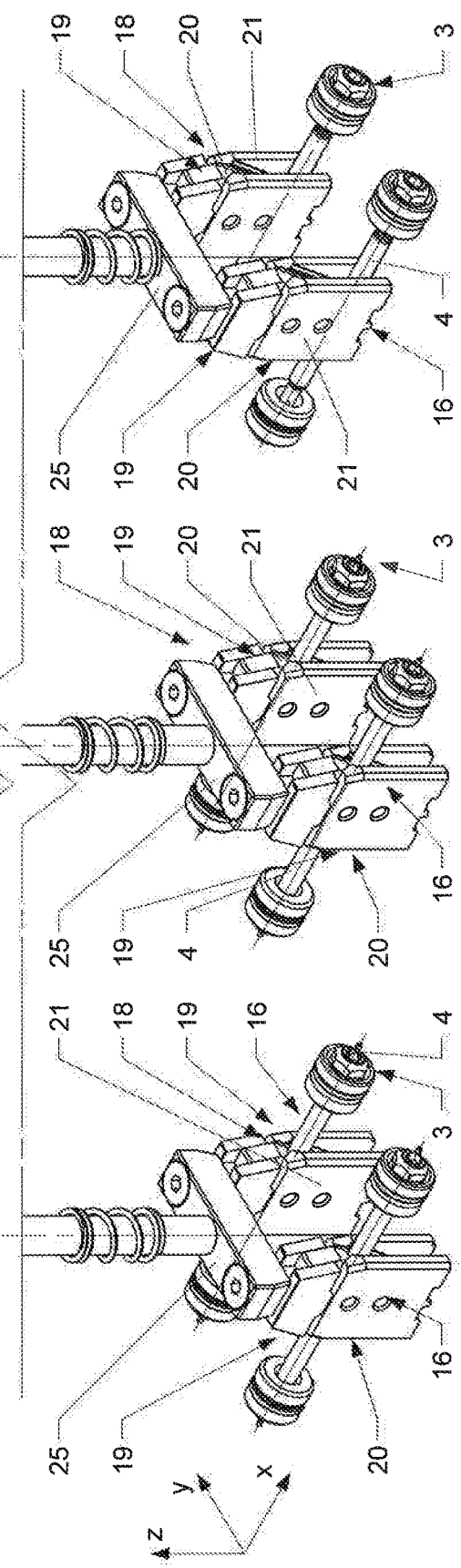
Fig. 9A  Fig. 9B  Fig. 9C

HOT RUNNER INJECTION NOZZLE AND DRIVE TRAIN

CROSS-REFERENCE TO RELATED APPLICATIONS

This application claims benefit of priority from European (EP) Patent Application Nos. 17156782.9, filed Feb. 17, 2017, and 17172036.0, filed May 19, 2017, which are both herein incorporated by reference in their entirety.

TECHNICAL FIELD

The present disclosure relates to a hot runner injection nozzle comprising a drive train to actuate a closure element by an actuator.

BACKGROUND

Hot runner nozzles comprising drive trains to actuate closure elements (valve pins) are known from the prior art. Several thereto related publications are briefly cited hereinafter.

WO15150501A1 was first published in October 2015 in the name of the same applicant as the herein disclosed invention. It is directed to a hot runner nozzle for side gating in a hot runner injection molding apparatus. A nozzle that is connectable to a melt outlet opening of a hot runner manifold. It comprises a nozzle flange portion, a nozzle body portion and a nozzle bridge portion. The nozzle bridge portion has at least two adjacently arranged nozzle tip sections. At least two valve pins are coupled to a valve pin actuating device which is moveable back and forth along a first axis. The at least two valve pins are moveable along a second axis which is arranged at an angle to the first axis. The nozzle tip sections are connected adjacent to the nozzle body portion and separated by a nozzle bridge separator, which is designed to accommodate movements of the nozzle tip sections.

US2008152752A was first published in June 2008 in the name of Mold Masters Ltd. It is directed to an injection molding apparatus which includes an injection manifold having an inlet and a melt channel. The manifold melt channel branches to a plurality of melt channel outlets. A hot runner injection nozzle includes an axial melt channel extending along a central axis and communicating with one of the manifold melt channel outlets. The nozzle further includes at least two angled melt channels disposed at an angle to the central axis. At least two nozzle tips are provided, and each includes a nozzle tip melt channel in communication with one of the angled melt channels. A valve pin is disposed at least partially within the axial melt channel coaxially with the central axis and movable within the axial melt channel. Lateral valve pins, movable within the nozzle tip melt channels, are disposed at an angle to the valve pin. Linkage elements continuously connect the lateral valve pins to the valve pin. Axial movement of the valve pin is transmitted through the linkage elements to the lateral valve pins to open and close communication between the nozzle tip melt channels and the lateral mold gates.

US2006233911A was first published in October 2008 in the name of the same applicant as the herein disclosed invention. US'911 is directed to an injection molding nozzle with a nozzle head including at least one discharge opening. A closure element for closing the discharge opening is movably supported in the nozzle head in order to control the supply of melt material to a communication opening in an injection mold. The closure element is operable by a drive mechanism provided with a short stroke actuating means for displacing the closure element in a direction opposite to the closing direction of the closure element by a predetermined short distance so as to automatically retract the closure element by the predetermined short distance when it is no longer biased by the actuating means in the closing direction.

SUMMARY

One aspect of the present disclosure is directed to a hot runner injection nozzle comprising an improved drive train, which interconnects an actuator and at least one thereto related closure element, which is arranged in a nozzle head of the injection nozzle at an angle with respect to the actuator. Such injection nozzles may e.g. be used for hot runner injection molding devices, such as injection molds and injection molding systems.

Injection nozzles for a hot runner injection molding device normally comprise at least one closure element which is interconnected to an actuator and a thereto interconnected closure element by a drive train, which allows the closure element to be displaced linearly in a first direction. While the closure element is arranged inside the injection molding device next to a thereto related valve gate opening and during operation interacts with the valve gate opening, the actuator is arranged further apart. More and more popular become injection nozzles wherein the closure element is arranged at an angle (perpendicular) with respect to the actuator. This often occurs in situations where a multiplicity of small parts needs to be molded which in addition are arranged relatively close to each other in the injection mold. The drive train therefore must fulfill special requirements with respect to size, robustness, temperature resistance and namely durability. Otherwise it cannot be guaranteed that the required specifications are met.

The drive train (respectively the injection nozzle comprising such a drive train) according to the present disclosure is based on a cam mechanism, which was first described in the European Patent Application No. 17156782.9 filed by the same applicant on Feb. 17, 2017. Priority is claimed of said application and the application is incorporated herein by reference. The drive train offers a simple but yet robust design which allows to realize comparatively small side-gating injection nozzles.

A drive train according to the present disclosure is foreseen to interconnect to and to actuate at least one closure element arranged movable in a nozzle head of an injection nozzle in a first direction. The drive train comprises a cam mechanism which comprises a wedge and at least one side plate, wherein the wedge and the side plate together are arranged moveable in a second direction interacting with at least one thereto related closure element. The wedge and the at least one side plate can be made from one block of material. However, in a preferred arrangement the wedge and at least one side block are made from different parts which are assembled as described hereinafter.

Per closure element, the wedge comprises at least one first drive surface, which interacts with a second drive surface arranged at the closure element at least during closing of the closure element as described hereinafter in more detail, i.e. when the closure element is pushed in an outward direction to close and thereby stop mold flow. The at least one side plate comprises a third drive surface which interacts with a fourth drive surface arranged at the closure element at least during opening of the closure element as described hereinafter in more detail, i.e. when the closure element is pulled into the closure element housing to open and thereby allow mold flow. Preferably the second drive surfaces are comparably larger than the respective third and fourth drive surface. Good results can be achieved when the second drive surface arranged at the rear end of the closure element has per closure element between about 1.25 and 3 times the size of the total area (sum) of the fourth drive surfaces as described hereinafter.

In a preferred embodiment the at least one side plate is attached to the wedge as a separate element. To obtain an evenly distributed and well balanced arrangement of the occurring forces the cam mechanism may comprise a first and a second side plate wherein the wedge is arranged between them. In the case that the wedge and the side plates are designed as separate parts, the wedge and the at least one side plate can be made from a different material. Alternatively or in addition at least one of the drive surfaces can be coated by a coating which reduces friction and/or increases durability. In a variation the wedge, which in a mounted position is arranged between two side plates, comprises at least one opening, which corresponds to a respective opening in the first and/or the second side plate. The corresponding openings are foreseen to receive a bolt to attach the wedge and the at least one side plate with respect to each other. The bolt can be a screw or a bolt that is e. g. secured by a press-fit and/or by heat shrinking and/or by welding, i.e. in that the bolt is welded to at least one side plate and/or the wedge. One advantage of this variation is that the inside of the cam head can be processed and controlled in a more convenient way. If appropriate the side plate may comprise at least one bearing surface to support during operation the wedge, respectively the at least one side plate directly or indirectly with respect to the closure element housing and thereby effectively compensate occurring reaction forces.

Particularly reliable injection nozzles for a variety of applications may be obtained if the first and the third drive surface of each closure element are arranged at an angle α with respect to the second direction, wherein the angle α is in the range of 10° to 30°.

The general spatial extension of the first and the third drive surface of the wedge and the at least one side plate are arranged each at an appropriate angle with respect to the second direction. In principle they should be arranged extending parallel to each other with respect to their general arrangement, respectively interaction with the closure element such that no unintended clamping occurs. If appropriate, the first and the third drive surfaces can have a non-flat design following parallel to each other. Thereby it is possible to influence the relative displacement of the closure element in the first direction in relation to the movement of the wedge in the second direction.

For actuating two closure elements arranged (coaxially) behind each other, the wedge may comprise two first drive surfaces which are arranged symmetrically with respect to the displacement direction (second direction).

Good results can be achieved if the third drive surface is arranged at a protrusion of the at least one side plate extending in an inward direction in general parallel to and spaced a distance apart from the first drive surface. This allows to design the closure elements comparably slim and therefore space saving. In a preferred variation the closure elements are having a cylindrical cross section with The thereto corresponding fourth drive surface is preferably arranged in a notch or at a shoulder arranged at the closure element. The protrusion and the thereto corresponding notch can have a V-shaped cross section resulting in a robust but yet precise interaction. In addition, it can have the positive effect of self-centering when arranged symmetric.

The present disclosure is also directed to an injection molding device comprising at least one injection nozzle as described herein. Such an injection molding device may e.g. be a hot runner injection molding device comprising at least one hot runner injection nozzle as described herein.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description, serve to explain the principles and operation of the concepts disclosed.

BRIEF DESCRIPTION OF THE DRAWINGS

The herein described disclosure will be more fully understood from the detailed description given herein below and the accompanying drawings which should not be considered limiting to the invention described in the appended claims. The drawings are showing:

FIG. 5 A second embodiment of a drive train in an exploded view;

FIG. 6 The drive train according to FIG. 5 in an assembled view;

FIG. 7 The cam mechanism;

FIG. 8 The actuator and the thereto interconnected closure element in three different positions;

FIG. 9 An embodiment of the drive train in three different positions shown in FIGS. 9A, 9B, AND 9C;

DETAILED DESCRIPTION

Reference will now be made in detail to certain embodiments, examples of which are illustrated in the accompanying drawings, in which some, but not all features are shown. Indeed, embodiments disclosed herein may be embodied in many different forms and should not be construed as limited to the embodiments set forth herein; rather, these embodiments are provided so that this disclosure will satisfy applicable legal requirements. Whenever possible, like reference numbers will be used to refer to like components or parts.

Figure 1:
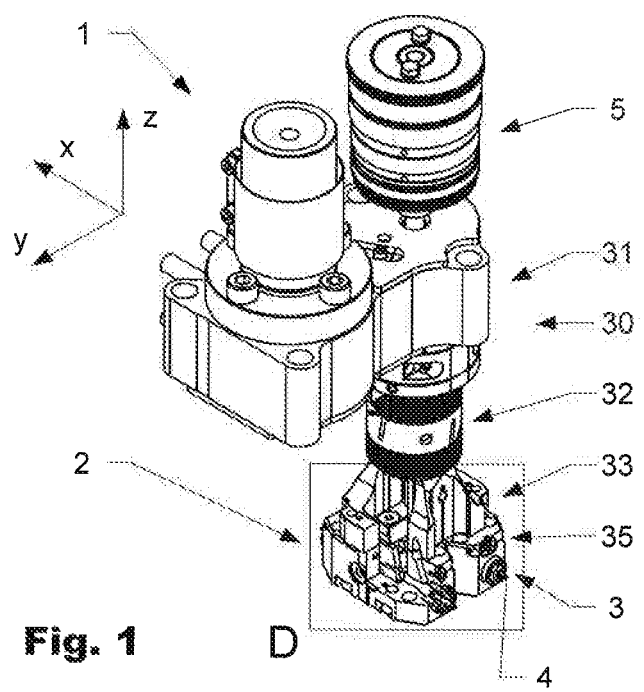
FIG. 1 A hot runner injection nozzle comprising a drive train in a partially cut view.
Figure 2:
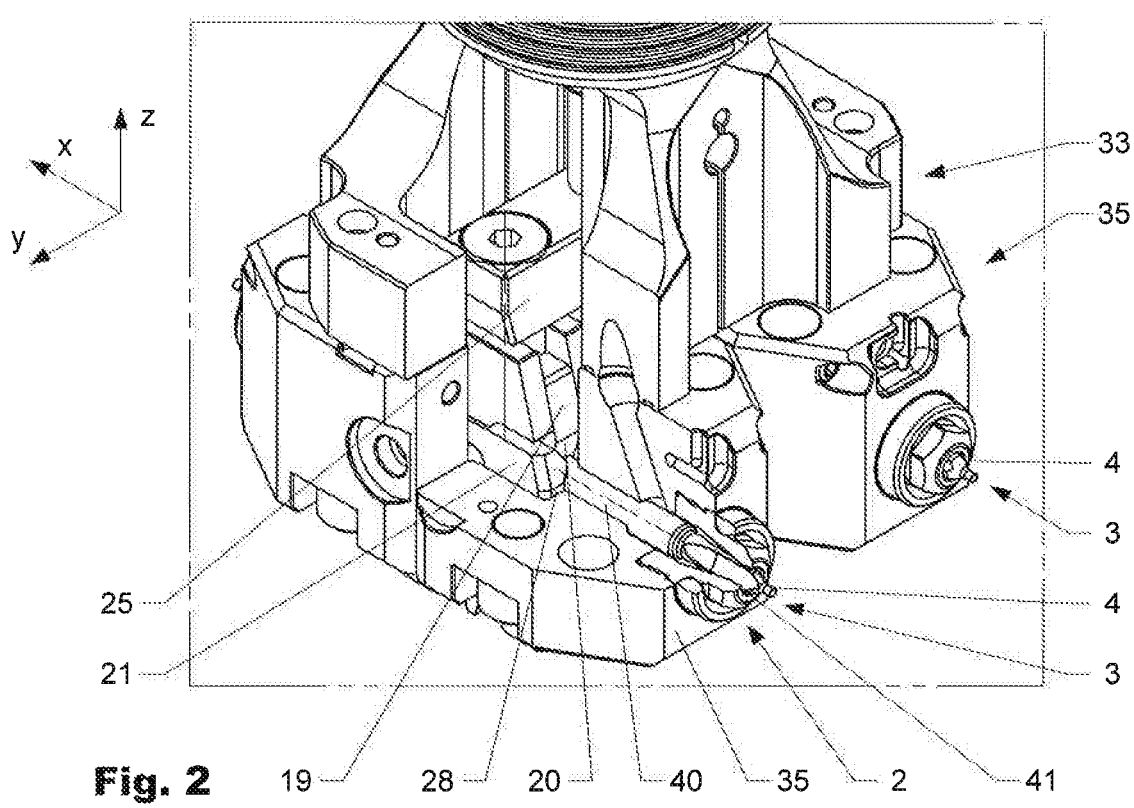
FIG. 2 Detail D of FIG. 1.
Figure 3:
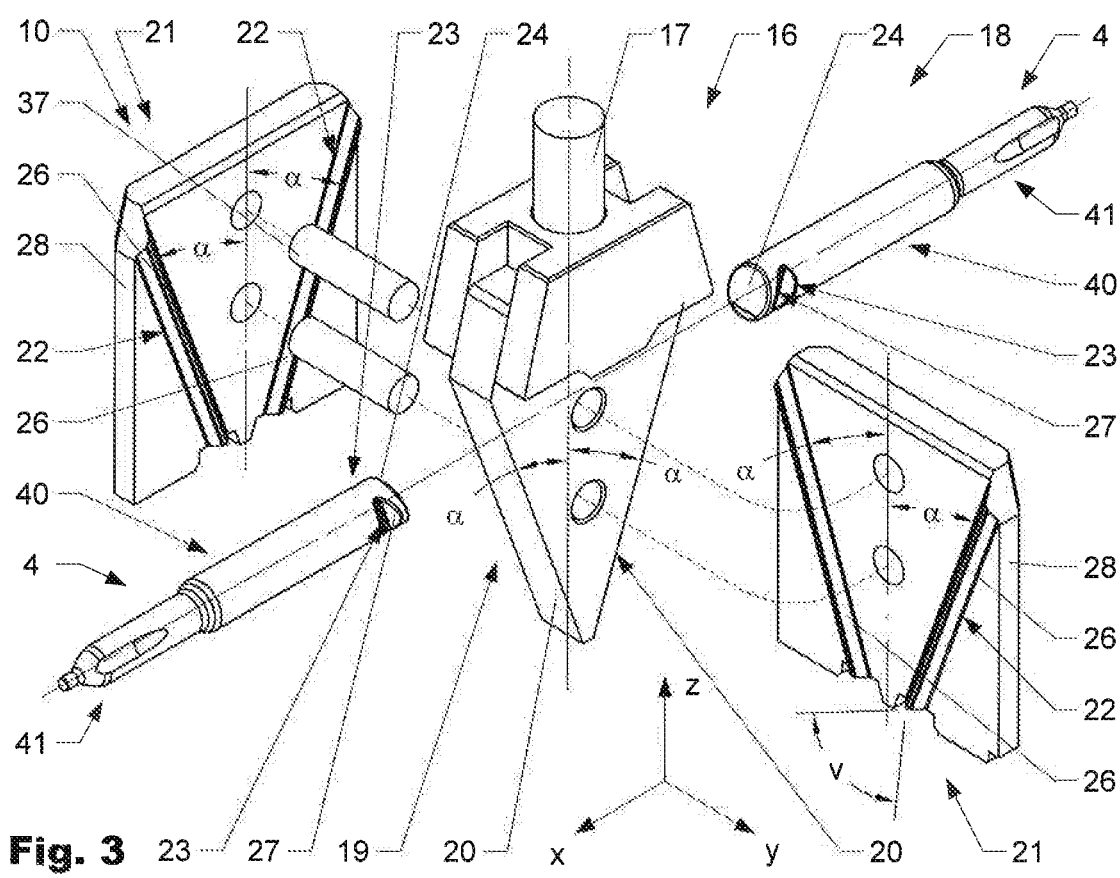
FIG. 3 A first embodiment of a drive train in an exploded view.
Figure 4:
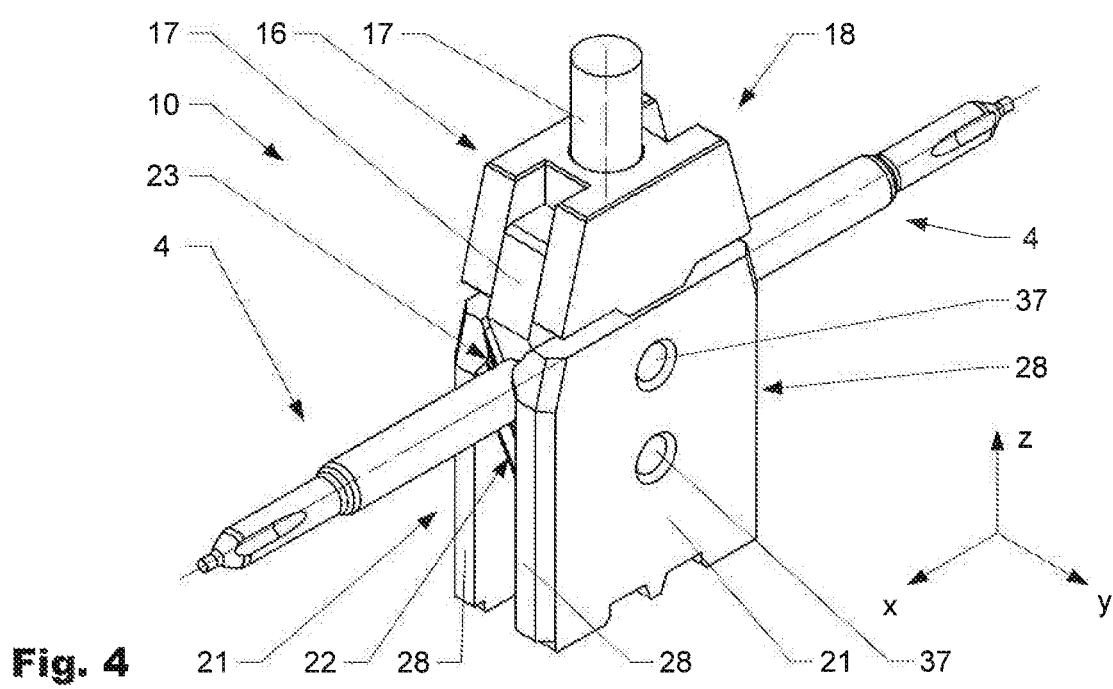
FIG. 4 The drive train according to FIG. 2 in an assembled view.

FIG. 1 shows an injection nozzle 1 in a perspective view in a partially cut manner. FIG. 2 shows Detail D of FIG. 1 in a magnified manner. FIG. 3 shows a first variation of a drive train 10 comprising a cam mechanism 18 in an exploded manner. FIG. 4 is showing the drive train 10 according to FIG. 3 in an assembled manner.

FIG. 5 shows a second variation of a cam head 16 in an exploded manner. FIG. 6 is showing the cam head 16 according to FIG. 5 in an assembled manner. FIG. 7 is showing the cam head 16 in a side view and FIG. 8 in a front view.

FIG. 3 and FIG. 5 show two variations of the cam mechanism 18 as herein mentioned above in an exploded view and in a simplified manner. The assembly of the exploded parts is indicated by dotted lines. The cam mechanism 18 according to FIG. 3 corresponds to the cam mechanism 18 as shown in the embodiment according to FIGS. 9A through 9C.

Figure 10:
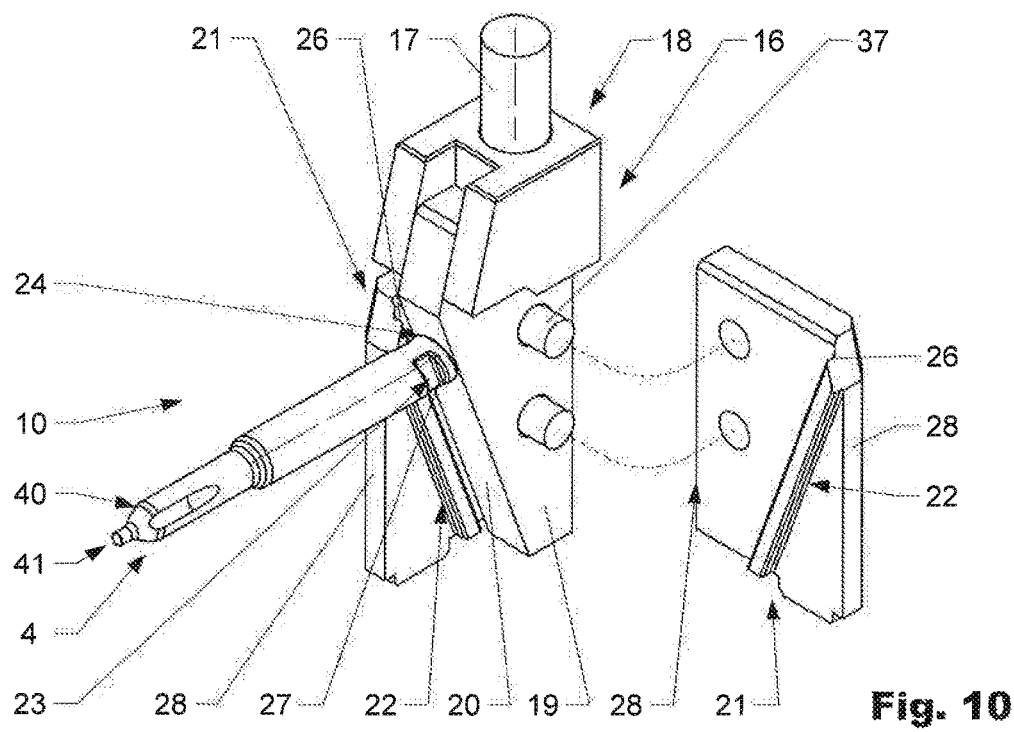
FIG. 10 A third embodiment of a drive train in an exploded view.
Figures 11, 12:
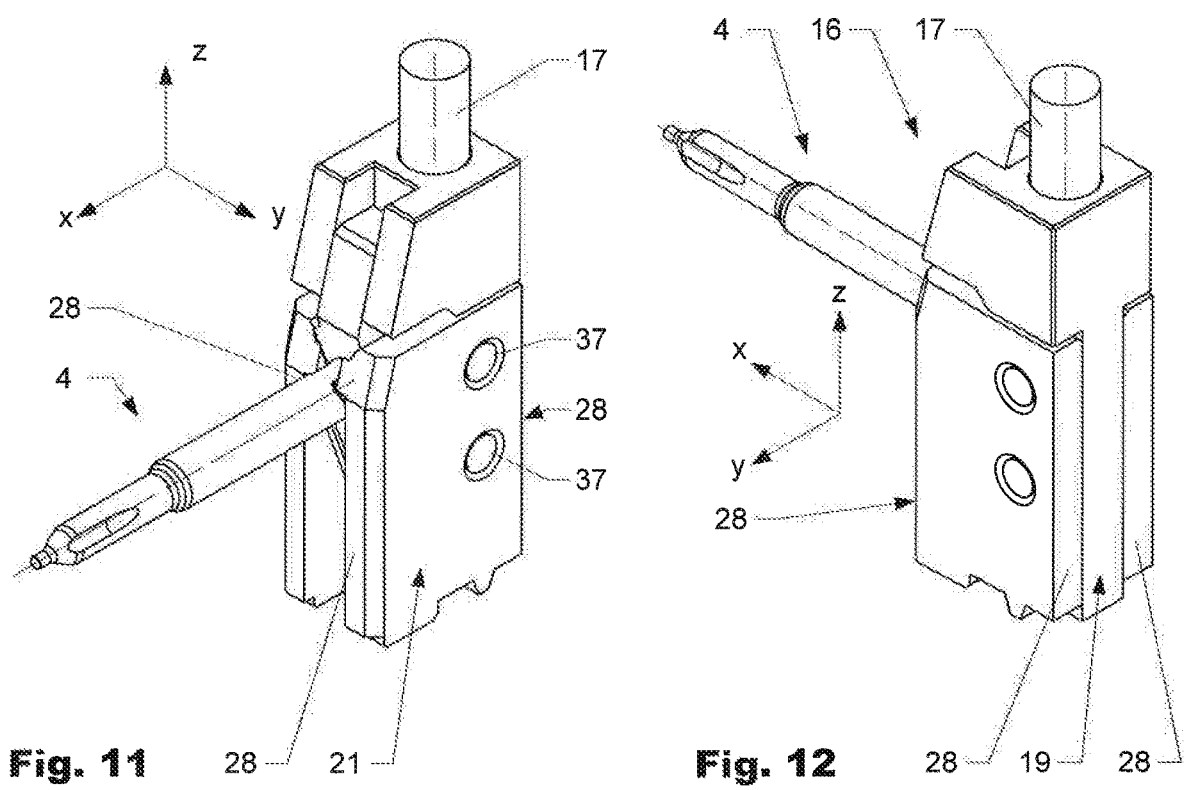
FIG. 11 The drive train according to FIG. 10 in a perspective view from a left side.
FIG. 12 The drive train according to FIG. 10 in a perspective view from a right side.

In FIG. 3 the cam mechanism 18 is shown without the bridge element 25 which interconnects two neighboring wedges 19 (respectively cam heads 16) arranged laterally adjacent to each other. While the wedge 19 is with respect to the viewer's direction arranged linearly moveable in z-direction, the closure elements 4 are arranged linearly moveable in x-direction. Perpendicular to the moving direction of the wedge 19, if appropriate, other angles would be possible. In the shown embodiment, the closure elements 4 are arranged symmetrically with respect to the z-axis (respectively yz-plane). In difference to this, the embodiment as shown in FIGS. 10 through 12 has an asymmetric setup in that only one closure element 4 is present which is activated by a cam mechanism 18 according to the present disclosure. The cam mechanism 18 has in principle the same setup as the herein described other embodiments. Therefore, with respect to the description of the general functionality, reference is made to these embodiments. In FIG. 10 the cam mechanism 18 is shown in an exploded manner in that one side plate 21 is removed. Assembly is indicated by dotted lines. While the first and the second drive surfaces 20, 24 are having the same design as in the other embodiments, the third and the fourth drive surfaces 26, 27 are having a different design: The protrusion comprising the third drive surface 26 is having an in principle rectangular (e.g. U-, respectively C-shaped) cross-section having two in principle parallel side walls. The notch 23 at the closure element 4 is shaped accordingly. In difference to the other embodiment having a V-shaped protrusion 22, respectively corresponding notch 23, this embodiment does not offer a self-centering behavior of the closure element during opening of the nozzle. If appropriate at least one bearing surface 28 may be foreseen to support the cam head 16 with respect to the closure element housing 35 (see e.g. FIG. 2) in lateral direction to compensate forces occurring due to opening and closing of the closure element 4.

As visible in FIGS. 3 through 8 the wedge 19 of each cam head 16 comprises per closure element 4 a first drive surface 20 arranged at an angle α with respect to the moving direction (z-direction) of the wedge 19. Depending on the field of application, the first drive surface 20 can have a non-flat design. The first drive surface 20 is foreseen to interact at least during a closing movement of the closure element 4 with a second drive surface 24 arranged at the rear end of the closure element 4 thereby pushing the closure element 4 in an outward direction away from the opposite closure element 4. In that the wedge 19 is moved in −z-direction (negative z-direction), due to the wedged arrangement of the first drive surfaces 20 at an angle α, the first drive surfaces 20 push via the second drive surfaces 24 the closure elements 4 apart from each other in an outward direction. The second drive surfaces 24 are preferably arranged as well at an angle α with respect to z-direction (90°-α with respect to x-direction).

To move the closure elements 4 in the opposite direction (against each other), each wedge 19 comprises or is interconnected to at least one third drive surface 26 which interacts, at least during opening of the thereto related closure element 4, with a thereto related fourth drive surface 27 arranged at the closure element 4. In the shown variation third drive surfaces 26 are arranged at a first and a second protrusion 22, which extend along a first and a second side plate 21. The side plates 21 are arranged in the mounted position (see e.g. FIG. 3) opposite to each other with respect to the wedge 19. The wedge 19, the first and the second side plates 21, as well as the first and the second protrusions 22 can be made in one piece. However, it is advantageous to design at least one side plate 21 removable as shown herein. As shown the side plates 21 can be interconnected to the wedge 19 by at least one bolt 37. Reliable operation can be achieved when the at least one bolt 37 is welded to the at least one side plate 21.

In the shown variation fourth drive surfaces 27 are arranged in a first and a second notch 23 arranged at a rear end of a thereto related closure element 4 spaced a distance apart from the second drive surface 24, which is arranged at the rear end of the closure element 4. If appropriate the fourth drive surfaces 27 can be arranged at a protrusion as well, e.g. at a shoulder extending outwardly (not shown in detail). Alternatively, the third drive surfaces 26 can be arranged in a recess formed in a side plate (not shown in detail). The first and third drive surfaces 20, 26 both extend in the same general direction (parallel to each other), i.e. the distance between them remains constant.

The cam head 16 may comprise at least one bearing surface 28 to support the cam head 16 with respect to the closure element housing 35 directly or indirectly (see FIG. 1) during operation in at least one direction. In FIG. 8 the closure element housing 35 is schematically indicated by dotted lines indicating support of the cam head 16 in x-direction during operation, to compensate unevenly distributed reaction forces. Thereby it is possible to transfer at least part of the reaction forces, which occur during operation of the drive train 10, to the closure element housing 35. Good results can be achieved when at least one bearing surface 28 is arranged at the side place 21. In a preferred variation, two bearing surfaces 28 are arranged opposite to each other at at least one side plate 21 as indicated in FIG. 8.

The closure elements 4 of the shown variation are having an in general cylindrical design with several diameters. A bearing surface 40 is arranged in a rearward section and a sealing surface 41 is arranged in a forward section (close to a discharge opening). The bearing surface 40 is used to support the closure element 4 with respect to the thereto related closure element housing 35 as shown in FIG. 1. The first and the second notch 23 are arranged in symmetric manner at the bearing surface 40. The notch has an in general V-shaped cross section, which matches to the cross section of the protrusion 22. The protrusion 22 has in the shown variation an in general V-shaped cross section as well (indicated by v in FIG. 3). The V-shaped cross sections offer advantages and improves self-centering of the elements during operation. Depending on the field of application, other cross-sections are applicable (e.g. U-shaped).

The drive train 17, comprising the cam mechanism 18, can in principle be used in connection with other nozzles/actuators and should thus be considered a separate inventive concept, which may be made subject of one or several divisional patent applications. The first, the second, the third and the fourth drive surfaces are preferably arranged such that (a) during moving of the closure elements 4 in an outside direction to close the nozzle, i.e. apart from each other, the first and the second drive surfaces 20, 24 are engaged and the third and the fourth drive surfaces 26, 27 remain disengaged, while (b) during moving of the closure elements 4 in an inside direction, i.e. against each other, to open the nozzle, the third and the fourth drive surfaces 26, 27 are engaged and the first and the second drive surfaces 20, 24 remain disengaged.

FIGS. 9A through 9C are showing in different positions several closure elements 4 interconnected to a first type of actuator cylinder 5 by a drive train 10 each comprising two cam heads 16. It should be noticed that the actuator cylinder 5 described hereinafter is of exemplary manner only. The drive train 10 according to the present disclosure can be used along with other actuators and/or closure elements.

In FIGS. 9A through 9C the actuator cylinder 5 and the thereto via the drive train 10 comprising a cam mechanism 18 interconnected closure elements 4 can be seen in three different positions. The housings of the injection nozzle are left away, such that the inside becomes better apparent. The first piston 7 is arranged movable between a first position (see FIG. 9A) in which the closure element 4 is fully closed (i.e. most outward position with respect the discharge opening 3). In a second position (see FIG. 9C) the closure element 4 is fully open (i.e. most inward position with respect the discharge opening 3).

In the shown variation a second piston 8 is interconnected to the closure element 4 (via the first piston 7) arranged movable between a third position (see FIGS. 9A and 9C) in which the second piston 8 is not interconnected to the closure element 4 and a fourth position (see FIG. 9A) in which the closure element 4 is, with respect to the discharge opening, limited in an intermediate position between the fully opened and the fully closed position. The first fluid chamber 12 when pressurized by a fluid causes the first piston 7 to go to the first position, while the second fluid chamber 13 when pressurized by a fluid causes the first piston 7 to go to the second position. The third fluid chamber 14 when pressurized by a fluid causes the second piston 8 to go to the third position and the fourth fluid chamber 15 when pressurized by a fluid causes the second piston 8 to go to the fourth position. If appropriate the second fluid chamber 13 and the third fluid chamber 14 can be supplied with pressurized fluid by a common supply line (see FIG. 9C). Thereby the first piston 7 can be moved to the second position, while the second piston is moved simultaneously to the third position. An active surface 9 of the first piston 7 is smaller than a corresponding total active surface of the second piston 8, such that when pressurized with the same pressure the second piston 8 has priority over the movement of the first piston 7. As visible in FIG. 9B the second piston 8 when in the fourth position limits the movement of the first piston 7 such that the closure element 4 remains in the intermediate position. In this intermediate position the closure element 4 does not extend into related the mold cavity (not shown in detail). Thereby it is secured that parts made are not damaged when opening the mold cavity to remove the molded body made therein.

The injection nozzle 1 as shown in FIGS. 1, 2 and 9 comprises in total four discharge openings 3 of which each can be opened and closed by a thereto related closure element 4. Two closure elements 4 are grouped forming a first and a second pair. The two closure elements 4 forming a pair are arranged coaxially with respect to each other and are interconnected by a common cam mechanism, comprising a wedge 19, to the actuator cylinder 5. The two wedges 19 as visible are interconnected by a bridge element 25 to the drive shaft 17. During opening and closing of the closure elements 4, unevenly distributed forces may occur, i.e. when a closure element needs more force to be operated compared to its counterpart. To compensate the resulting forces at least one of the side plates 21 may comprise a bearing surface 28 by which the cam mechanism 18 is supported with respect to the closure element housing 35 of the nozzle head 2.

While the invention has been described with respect to a limited number of embodiments, those skilled in the art, having benefit of this disclosure, will appreciate that other embodiments can be devised which do not depart from the scope of the invention as disclosed herein. The words used in the specification are words of description rather than limitation, and it is understood that various changes may be made without departing from the spirit and scope of the invention.

| LIST OF DESIGNATIONS | |
|---|---|
| x | First direction |
| z | Second direction |
| 1 | Injection nozzle |
| 2 | Nozzle head |
| 3 | Discharge opening |
| 4 | Closure element (valve pin) |
| 5 | Actuator (actuator cylinder) |
| 7 | First piston |
| 8 | Second piston |
| 10 | Drive train |
| 12 | First fluid chamber |
| 13 | Second fluid chamber |
| 14 | Third fluid chamber |
| 16 | Cam head |
| 17 | Drive shaft |
| 18 | Cam mechanism |
| 19 | Wedge |
| 20 | First drive surface (wedge) |
| 21 | Side plate |
| 22 | Protrusion |
| 23 | Notch |
| 24 | Second drive surface (closure element) |
| 25 | Bridge element |
| 26 | Third drive surface |
| 27 | Fourth drive surface |
| 28 | Bearing surface (side plate) |
| 30 | Nozzle housing |
| 31 | Nozzle flange |
| 32 | Nozzle body section |
| 33 | Nozzle bridge portion |
| 34 | Nozzle tip retainer |
| 35 | Closure element housing |
| 37 | Bolt |
| 38 | Opening (bore) |
| 40 | Bearing surface (closure element) |
| 41 | Sealing surface (closure element) |
| 42 | Side wall |

The invention claimed is:

1. An injection nozzle for an injection molding device comprising an actuator interconnected via a drive train to at least one closure element arranged movable in a nozzle head in a first direction, the drive train comprising
   a. a cam mechanism with a wedge and a first side plate, the wedge and the first side plate together being arranged moveable in a second direction,
   b. wherein per closure element the wedge comprises at least one first drive surface which interacts with a second drive surface arranged at the at least one closure element at least during closing of the at least one closure element;
c. wherein the first side plate comprises a third drive surface which interacts with a fourth drive surface arranged at the at least one closure element at least during opening of the at least one closure element; and
d. wherein the first side plate is attached to the wedge as a separate element.

2. The injection nozzle according to claim 1, wherein the cam mechanism further comprises a second side plate and the wedge is arranged between the first and the second side plate.

3. The injection nozzle according to claim 2, wherein each side plate is attached to the wedge as a separate element.

4. The injection nozzle according to claim 1, wherein the wedge and the first side plate are made from a different material.

5. The injection nozzle according to claim 1, wherein the first side plate is interconnected to the wedge by welding.

6. The injection nozzle according to claim 1, wherein the first side plate is interconnected to the wedge by at least one bolt.

7. The injection nozzle according to claim 1, wherein the first and the third drive surface per closure element are arranged at an angle $\alpha$ with respect to the second direction, wherein the angle $\alpha$ is in the range of 10° to 30°.

8. The injection nozzle according to claim 1, wherein the wedge comprises two first drive surfaces which are arranged symmetrically with respect to the second direction.

9. The injection nozzle according to claim 1, wherein the third drive surface is arranged at a protrusion of the first side plate extending parallel to and spaced a distance apart from the first drive surface.

10. The injection nozzle according to claim 1, wherein the fourth drive surface is arranged at a shoulder or in a notch arranged at the closure element.

11. The injection nozzle according to claim 1, wherein the area of the second drive surface is larger than the area of the fourth drive surface.

12. The injection nozzle according to claim 1, wherein the wedge and the first side plate are interconnected to each other by at least one bolt which is arranged in an opening.

13. The injection nozzle according to claim 1, further comprising a closure element housing that houses the at least one closure element, wherein the cam mechanism comprises at least one bearing surface to support the cam mechanism during operation with respect to the closure element housing.

14. The injection nozzle according to claim 13, wherein the at least one bearing surface is arranged at the first side plate.

15. An injection molding device comprising at least one injection nozzle according to claim 1.

16. The injection nozzle according to claim 1, comprising at least a second side plate.

17. The injection nozzle according to claim 16, wherein each side plate is attached to the wedge as a separate element.

18. The injection nozzle according to claim 1, wherein the at least one closure element comprises two fourth drive surfaces, wherein the area of the second drive surface is greater than the combined area of the two fourth drive surfaces.

* * * * *